No. 672,589. Patented Apr. 23, 1901.
W. F. BOSSERT.
INTERIOR CONDUIT CAPPING.
(Application filed Feb. 13, 1901.)
(No Model.)
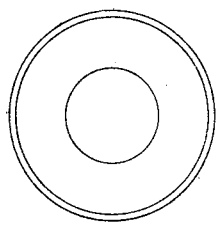
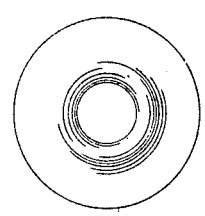
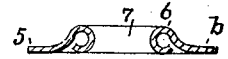
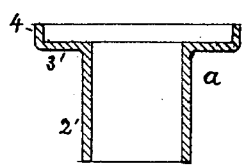
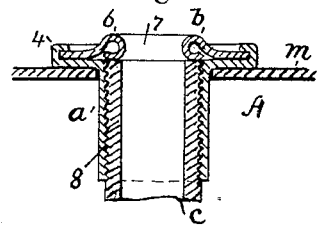
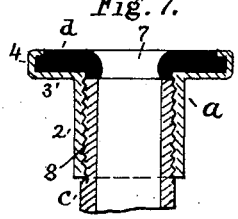
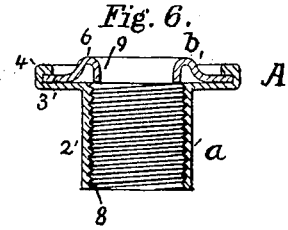
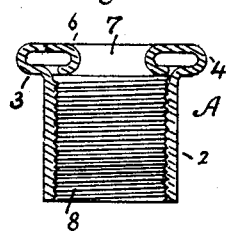
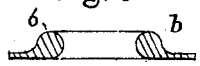
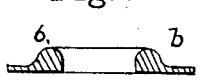
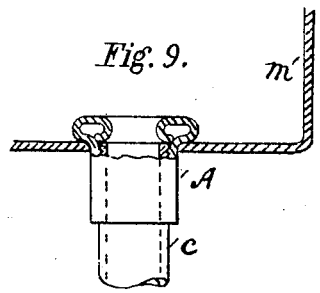
WITNESSES:
M. J. Pierce.
E. E. Ingalls.
INVENTOR.
William F. Bossert
BY Geo. Willis Pierce
ATTORNEY.
THE NORRIS PETERS CO., PHOTO-LITHO., WASHINGTON, D. C.

UNITED STATES PATENT OFFICE.

WILLIAM F. BOSSERT, OF UTICA, NEW YORK, ASSIGNOR TO THE BOSSERT ELECTRIC CONSTRUCTION COMPANY, OF SAME PLACE.

INTERIOR-CONDUIT CAPPING.

SPECIFICATION forming part of Letters Patent No. 672,589, dated April 23, 1901.

Application filed February 13, 1901. Serial No. 47,118. (No model.)

*To all whom it may concern:*

Be it known that I, WILLIAM F. BOSSERT, residing at Utica, in the county of Oneida and State of New York, have invented certain Improvements in Interior-Conduit Cappings, of which the following is a specification.

The present invention relates to the interior-conduit systems with which modern buildings are now commonly equipped. Such conduits, consisting of iron pipes, are located in the partitions and floors of the building and are brought to central points in the walls thereof, where junction-boxes are provided, to which the ends of the pipes terminate. Previously these pipes' ends extended into the boxes, and the conductors threaded into the same were brought out into the box. At the present time, however, the ends of the pipes are provided with cappings or outlet-thimbles, by means of which the pipes are secured to the walls of the box, and the cappings are made with smooth orifice-surfaces, so that the conductors can be drawn over them without injuring the insulation.

My invention specifically relates to an improved form and construction of cappings by means of which the ends of the conduits are secured to the walls of the junction-box, and the flanged end of the capping is made as thin as possible, so that it will occupy very little space within the box—a great desideratum, as in many boxes in which switches are located all the space that can be obtained is required, it being necessary for many reasons to make the boxes as small and compact as may be.

I may construct the capping as an integral whole or in two parts or portions. When made in two portions, the main part consists of an internally-threaded tube having a flange on one end, provided with a rim whose edge is turned over to embrace the periphery of the second part, which consists of a disk provided with a central orifice having rounded surfaces, the diameter of the orifice being less than the internal diameter of the tube. The said first part may be made in the form of a casting or a forging or may be drawn into shape from a piece of ductile sheet metal, and the second part may be made also as a casting, a forging, or drawn or spun up from ductile sheet metal, or it may consist of suitable insulation.

When the capping is made as an integral whole, it is composed of metal, preferably of a ductile sheet, and drawn up into practically the same outline as just described of the two-part construction. The tubular part is internally threaded, and the flanged end is made thin and flat, so as to project but little into the junction-box, and forms a shoulder against the inside wall of the said box and locks the conduit to the same.

Of the drawings forming a part of this specification, Figures 1 and 2 are sectional and top views of the first part of the capping, and Figs. 3 and 4 are sectional and top views of the second part of the capping, while Fig. 5 is a sectional view of the said two parts assembled and screwed into the end of a conduit-pipe. Figs. 3ª, 6, 6ª, 7, 8, and 9 are sectional views of modifications.

In Fig. 5, A represents the capping or outlet-cover, composed of the parts $a$ and $b$. The part $a$ consists of a tubular portion 2, provided with an internal thread 8 and a flange 3 on one end, provided with the rim 4, and the part $b$ consists of the disk 5, whose central portion has a perforation 7, the edges of which are rolled outward and inward to form a ring or annulus 6, whose lower curve is preferably on a level with the under surface of the flat part 5. The part $a$ may be cast or forged or may be drawn up from sheet metal in the shape shown by Figs. 1 and 2 and the internal thread 8 then cut in the tube 2, while the part $b$ is preferably made from sheet metal and spun up into shape, as shown in Figs. 3 and 4. The latter part is placed upon the flange 3 and the rim 4 crimped down upon its edge 5, holding it firmly in place. The orifice 7 is preferably of smaller diameter than the internal diameter of the tubular part 2, and when the capping A is screwed upon the end of a conduit-pipe $c$ the inner or under surface of the roll 6 forms an abutment for the end of the pipe. As constructed the flanged end 3 of the capping A projects very slightly into the interior of a junction-box, a portion of the wall $m$ of which is shown in Fig. 5, and forms a shoulder against the inside of the wall $m$ of the box and locks the conduit to the same.

Figs. 3ª and 6ª are sectional views of modifications of the second part $b$ shown in Figs. 3 and 6, respectively, in which the roll 6 is made solid instead of hollow, as shown in the latter figures.

Fig. 6 is a modification in which the roll 6 does not have an inward curve, but is made straight and parallel with the tube 2, its end forming an abutment for the pipe end.

Fig. 7 is a modification in which the second part $d$ of the capping is of insulating material, which may be formed from solid fiber or other insulation, which is inserted into the flange 3 and the rim crimped down upon its edge; or the rim may be turned over and the insulation be put in place while in a plastic condition. In either case the orifice 7 has a rounded surface and its diameter is less than the internal diameter of the tube 2.

Figs. 8 and 9 show the capping A made in one piece of metal, the tube 2 being threaded and the metal bending outward to form a shoulder 3 and then returned toward the center and rounded inward, so that the inner curve is on a plane with the shoulder 3 and constitutes an abutment for the end of the conduit $c$. When made as an integral whole, it is preferably struck up from sheet metal, the diameter of the orifice being somewhat smaller that the diameter of the threaded tubular portion.

I claim as my invention—

1. A capping for interior conduits consisting of an interiorly-threaded tube with a thin flat flanged end, having an orifice or entrance to the interior of the tubular part rounded outwardly and inwardly with a diameter less than that of the internal diameter of the conduit, the shoulder of the flange adapted to lock the conduit to the wall of the box, as set forth.

2. A capping composed of two parts or portions, the first part consisting of an internally-threaded tube having a flange on one end whose edge is turned over to embrace the periphery of the second part, which consists of a disk provided with a central orifice having rounded surfaces, the diameter of the orifice being less than the internal diameter of the tube, as set forth.

3. A capping composed of two parts or portions, the first part consisting of an internally-threaded metal tube having a flange on one end whose edge is turned over to embrace the periphery of the second part which consists of a metal disk provided with a central orifice having internally and externally rounded surfaces, the diameter of the orifice being less than the internal diameter of the tube to form a shoulder, as set forth.

4. A capping composed of two parts or portions, the first part consisting of an internally-threaded metal tube having a flange struck up from a piece of sheet metal, the flange edge turned over to embrace the periphery of the second part, which consists of a metal disk provided with a central orifice struck up from a piece of sheet metal, the orifice having interior and exterior rounded surfaces, the diameter of the orifice being less than the internal diameter of the tube, to form a shoulder, as set forth.

In testimony whereof I have signed my name to this specification, in the presence of two subscribing witnesses, this 7th day of February, 1901.

WILLIAM F. BOSSERT.

Witnesses:
SAMUEL PETERS,
FRED T. FOXENBERGER.